United States Patent
Peng et al.

(10) Patent No.: US 8,827,535 B2
(45) Date of Patent: Sep. 9, 2014

(54) BACKLIGHT MODULE

(75) Inventors: Ci-Guang Peng, Hsin-Chu (TW); Te-Hen Lo, Hsin-Chu (TW); Cheng-Yu Wang, Hsin-Chu (TW); Ming-Sheng Lai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 373 days.

(21) Appl. No.: 12/833,054

(22) Filed: Jul. 9, 2010

(65) Prior Publication Data

US 2011/0007523 A1 Jan. 13, 2011

(30) Foreign Application Priority Data

Jul. 10, 2009 (TW) .............................. 098123345 A
Jun. 4, 2010 (TW) .............................. 099118195 A (51) Int. Cl.
*F21V 8/00* (2006.01)
*F21V 21/00* (2006.01)

(52) U.S. Cl.
CPC .................................. *G02B 6/0031* (2013.01)
USPC ........................................ 362/633; 362/608

(58) Field of Classification Search
CPC ................................................... G02B 6/0031
USPC ...................... 362/609, 97, 29, 30, 632–634
See application file for complete search history.

(56) References Cited

U.S. PATENT DOCUMENTS

| | | | |
|---|---|---|---|
| 5,712,694 A | 1/1998 | Taira et al. | |
| 5,886,759 A | 3/1999 | Mashino et al. | |
| 6,074,070 A | 6/2000 | Sasako | |
| 6,856,363 B2 | 2/2005 | Kim | |
| 2002/0027712 A1* | 3/2002 | Soskind | 359/565 |
| 2005/0078469 A1* | 4/2005 | Jeong | 362/31 |
| 2006/0181901 A1* | 8/2006 | Sakai et al. | 362/613 |
| 2007/0008275 A1 | 1/2007 | Sugitani et al. | |
| 2007/0147093 A1* | 6/2007 | Chang | 362/633 |

FOREIGN PATENT DOCUMENTS

| | | |
|---|---|---|
| CN | 1721928 A | 1/2006 |
| CN | 100416370 C | 9/2008 |
| CN | 100514150 C | 7/2009 |

OTHER PUBLICATIONS

Chinese language office action dated Jul. 20, 2011.
English translation of abstract of CN 100416370C.
English translation of abstract of CN 100514140C.
Chinese language office action dated Nov. 30, 2011.
Chinese language office action dated Jun. 15, 2012.

\* cited by examiner

*Primary Examiner* — Elmito Breval
(74) *Attorney, Agent, or Firm* — McClure, Qualey & Rodack, LLP (57) ABSTRACT

This present invention discloses a backlight module including a frame and a light guide plate. The frame includes a base plane and a side wall, wherein the side wall is disposed at the edge of the base plane and encloses a disposition space. The side wall includes a first inner surface and an outer surface, wherein a distance between the first inner surface and the outer surface is decreased as the first inner surface comes closer to a bottom of the side wall. The light guide plate is disposed on the base plane and within the disposition space, wherein the first inner surface sinks toward the outer surface and a recessed space is formed between the first inner surface and a lateral side of the light guide plate.

20 Claims, 6 Drawing Sheets

BACKLIGHT MODULE

BACKGROUND OF THE INVENTION

1. Field of the Invention

The present invention relates to a backlight module, and specifically to a backlight module having light emitting diodes.

2. Description of the Prior Art

Flat display panels and flat display devices using the flat display panels are becoming the mainstream of the display device. Especially, the liquid crystal devices are now very prominent amongst conventional flat display devices and are greatly used in electronic products such as display screens, household flat televisions, flat displays of personal computers and laptop computers, display screens of mobile phones, and digital cameras.

The backlight module is one of the key components of the conventional liquid crystal display panels. Due to the fact that liquid crystal does not generate light by itself, the backlight module is used to provide adequate and evenly distributed light for the liquid crystal display panels to display images.

Figure 1:
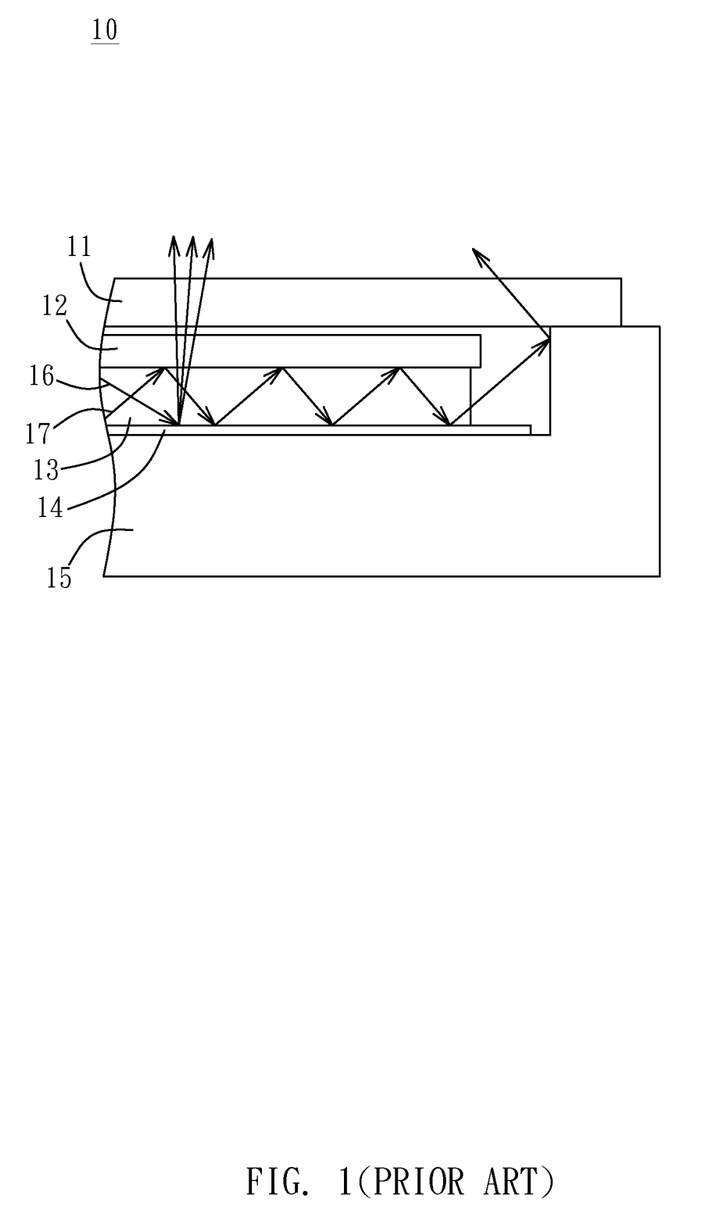
FIG. 1 is a cross-sectional view of a conventional liquid crystal display device.

FIG. 1 is a cross-sectional view of a conventional liquid crystal display device. As FIG. 1 shows, the conventional liquid crystal display device 10 includes a display panel 11, an optical film set 12, a light guide plate 13, a reflector 14 and an outer frame 15. The optical film set 12, the light guide plate 13 and the reflector 14 are disposed on the outer frame 15. The optical film set 12 includes optical films such as reflective polarizer, diffusion plate, and prism plate for processing light emitted from the light guide plate 13. Furthermore, the conventional liquid crystal display device 10 includes a light source (not illustrated) disposed next to the light guide plate 13 and configured to emit light into the light guide plate 13. As FIG. 1 shows, a first light 16 and a second light 17 exist in the light guide plate 13, wherein the first light 16 exits from the bottom of the light guide plate 13 and is then dispersed by the reflector 14 into lights of different directions. The first light 16 dispersed by the reflector 14 passes through the optical film set 12 and then into the display panel 11 to provide the display panel 11 with enough light for displaying images.

However, as FIG. 1 shows, the second light 17 undergoes total reflection within the light guide plate 13, exits from one lateral side of the light guide plate 13 and then contacts the outer frame 15. The outer frame 15 can reflect light so that the second light 17 is reflected by the outer frame 15 and travels through the display panel 11 without passing through the optical film set 12. In this way, the second light 17 exiting from the lateral side of the light guide plate 13 is reflected by the outer frame 15 and concentrated at the edge of the display panel 11. The concentration of light will form a bright line at the edge of the display panel 11 which adversely affects the overall images of the conventional liquid crystal display device 10.

SUMMARY OF THE INVENTION

It is an object of the present invention to provide a backlight module for decreasing the light leakage.

The backlight module of the present invention includes a frame and a light guide plate, wherein the frame includes a base plane and a side wall. The side wall disposed around the edge of the base plane and encloses a disposition space which is used to accommodate the light guide plate and the optical film set. The side wall includes a first inner surface and an outer surface, wherein the first inner surface substantially faces the disposition space and the light guide plate. Furthermore, a recessed space exists between the first inner surface and the light guide plate, wherein the distance between the first inner surface and the outer surface decreases as the first inner surface comes closer to the bottom of the side wall. In one embodiment, the first inner surface is a curved surface, but is not limited thereto; in different embodiments, the first inner surface can be a stepped surface, a sawtooth surface or other different types of surfaces.

DETAILED DESCRIPTION OF THE PREFERRED EMBODIMENT

The present invention relates to a backlight module and specifically to an edge-lighting backlight module. The present invention changes the shape and structure of the frame of the backlight module to reflect light emitted from a light guide plate back to the light guide plate. The light will then be optically converted into a diffused light for a display panel to display images. In other words, the present invention concerns the change in shape and structure of the frame in order to recycle light emitted from the light guide plate and reduce the light leakage at the edge of the display device.

Figure 2:
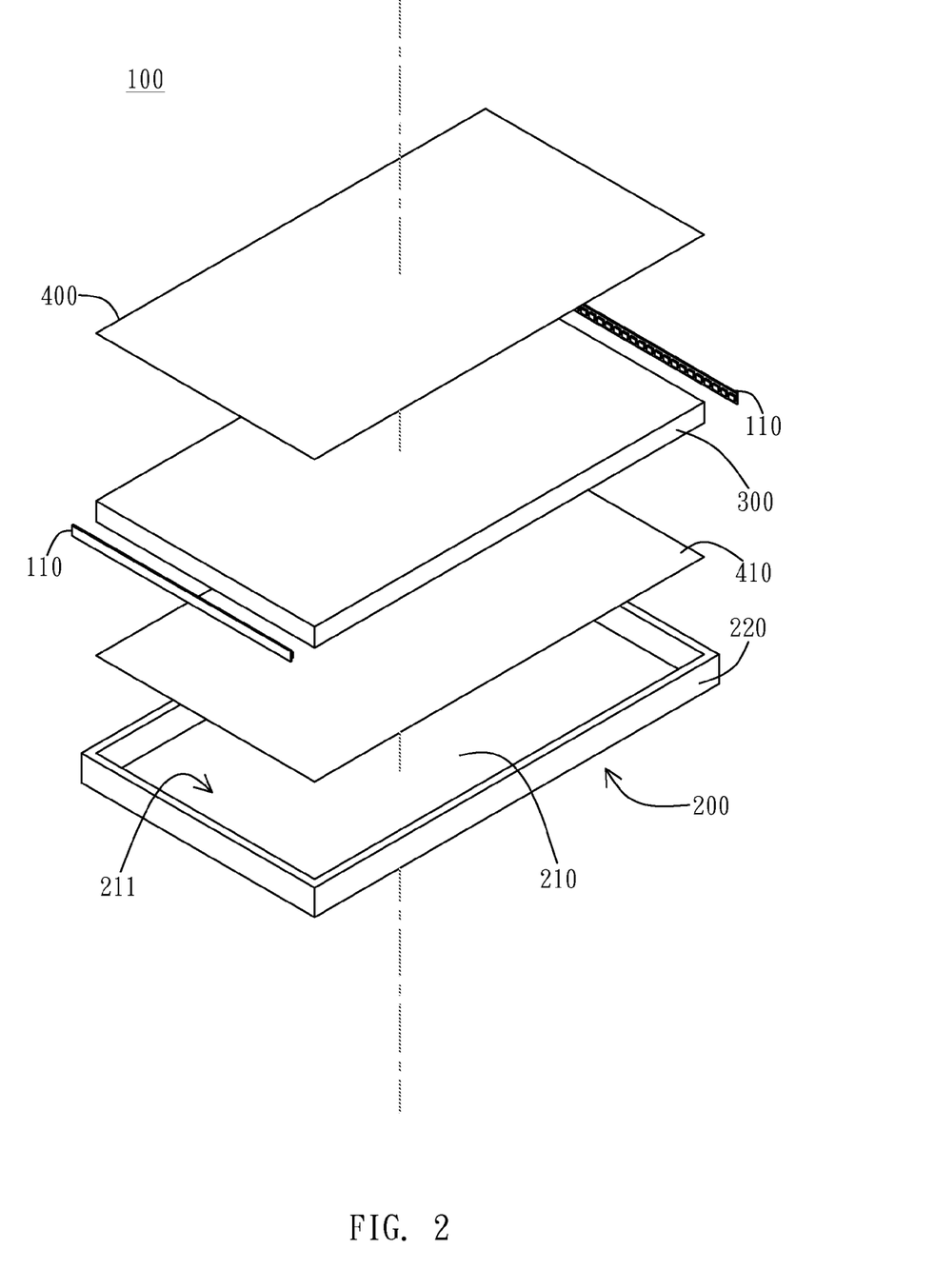
FIG. 2 is an exploded view of the backlight module of the present invention.
Figure 3:
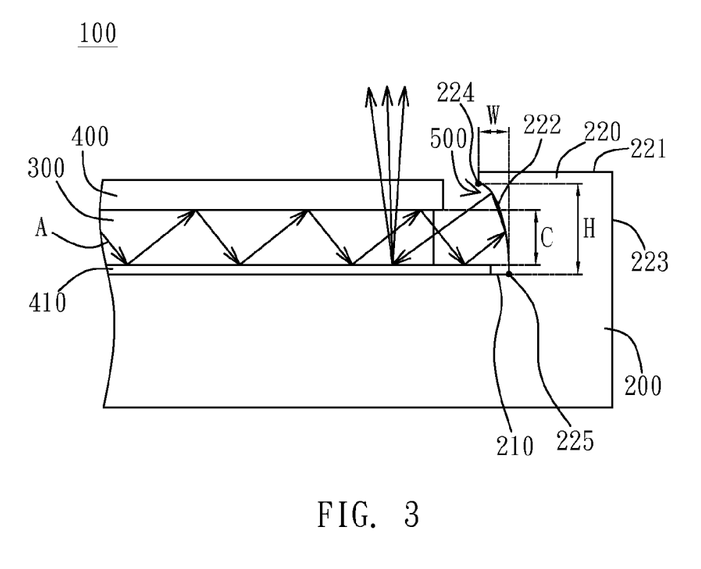
FIG. 3 is a cross-sectional view of the backlight module of the present invention.

FIG. 2 and FIG. 3 are an exploded view and a cross-sectional view of the backlight module 100 of the present invention. As FIG. 2 shows, the backlight module 100 of the present invention includes a light source 110, a frame 200, a light guide plate 300, an optical film set 400 and a reflector 410, wherein the frame 200 includes a base plane 210 and a side wall 220, but is not limited thereto. In different embodiments, the base plane 210 of the frame 200 can be replaced by the reflector 410. In other words, the reflector 410 can be attached to the bottom of the side wall to save the material used to form the base plane 210. As FIG. 2 shows, the side wall 220 is disposed at the edge of the base plane to enclose a disposition space 211 which is used to accommodate the light source 110, the light guide plate 300, the optical film set 400 and the reflector 410. Furthermore, the reflector 410 is disposed on the base plane 210. The light source 110 and the light guide plate 300 are disposed on the reflector 410 while the optical film set 400 is disposed on the light guide plate 300. In the present embodiment, the backlight module 100 is an edge-lighting backlight module, wherein the light source 110 is disposed on a lateral side of the light guide plate 300, but is not limited thereto. The light source 110 of the present embodiment is a light emitting diode bar, but is not limited thereto. In different embodiments, the light source 110 also includes cold cathode fluorescent lamps or other suitable light sources. Furthermore, the optical film set 400 is used to accept light emitted from the light guide plate 300 and optically adjusts the intensity and uniformity or other characteristics of the light and converts the light emitted from the light guide plate 300 into a diffused light. The optical film set 400 of the present embodiment includes a diffuser and brightness enhancing film, but is not limited thereto. The optical film set 400 can also include a P-S converter, a reflective polarizer, and other suitable optical films.

FIG. 3 is the cross-sectional view of the backlight module of the present invention. As FIG. 3 shows, the side wall 220 includes a top surface 221, a first inner surface 222, and an outer surface 223, wherein the first inner surface 222 faces the light guide plate 300 and extends from the top surface 221 towards the base plane 210. Furthermore, a recessed space is formed between the first inner surface 222 and the light guide plate 300. A width W of the recessed space 500 is defined as the distance from the inner end 225 to the projection of the top point 224 on the base plane 210, wherein the width W increases as the recessed space 500 approaches the base plane 210. In other words, the first inner surface 222 sinks toward the outer surface 223 as the first inner surface 222 approaches the base plane 210. Furthermore, as FIG. 3 shows, the first inner surface 222 extends from a top end of the side wall 220 toward an inner end 225, wherein the distance between the first inner surface 222 and the outer surface 223 decreases as the first inner surface 222 comes closer to the bottom of the side wall 220.

In the present embodiment, a height H of the recessed space 500 is greater than the thickness of the light guide plate 300, but is not limited thereto; the height H can be equal to the thickness of the light guide plate. In different embodiments, the height H can be adjusted based on the curvature of the first inner surface 222, the location of the top surface 221, or other factors. Furthermore, in the embodiment illustrated in FIG. 3, sections of the cross-section of the first inner surface 222 have different slopes and curvatures. In other words, the slope and the curvature of the first inner surface 222 corresponds to at least a portion of a circumference of an ellipse, but is not limited thereto. In different embodiments, the first inner surface 222 can be adjusted to have the slope and curvature of other suitable shape (such as a perfect circle) based on the thickness of the light guide plate 300, requirements of the molding process for the frame 200, dimension of the recessed space 500, or other factors.

In the embodiment illustrated in FIG. 3, the ratio between the height H of the recessed space 500 and the thickness of the light guide plate 300 is preferably 1.6, but is not limited thereto; in different embodiments, the above-mentioned ratio can be adjusted to be equal to or greater than 1, but smaller than 2. In other words, if the thickness of the light guide plate 300 is C, then the relationship between the thickness C of the light guide plate 300 and the height H of the recessed space 500 can be expressed by Formula (1) below:

$$1 \leq H/C \leq 2 \tag{1}$$

Furthermore, the ratio between the width W and the height H of the recessed space 500 is substantially 0.2, but is not limited thereto; in different embodiments, the ratio can be adjusted to be greater than 0.1 and smaller than 0.3. In other words, the relationship between the width W and the height H can be expressed by Formula (2) below:

$$0.1 \leq W/H \leq 0.3 \tag{2}$$

Furthermore, the height of the top surface 221 relative to the base plane 210 is preferably greater than that of the optical film set 400 relative to the base plane 210. In the present embodiment, a display panel such as a liquid crystal display panel can be disposed on the top surface 221 and not making contact with the optical film set 400.

Figure 4:
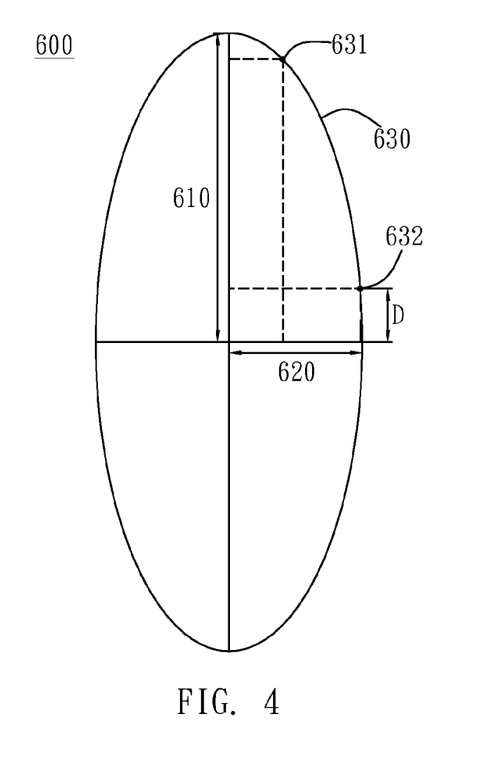
FIG. 4 is a schematic view of an ellipse corresponding to the first inner surface illustrated in FIG. 3, wherein the cross-section of the first inner surface correspond to the curvature of a portion of the ellipse.

Furthermore, in the embodiment illustrated in FIG. 3, the first inner surface 222 is a curved surface and the cross-section of the first inner surface corresponds to the curvature and length of a portion of a circumference of an ellipse. FIG. 4 illustrates a schematic view of the above-mentioned ellipse 600. The ellipse 600 includes a first axis 610 and a second axis 620, wherein the first axis 610 and the second axis 620 intersect the ellipse to obtain a reference circumference. In other words, the reference circumference 630 of the present embodiment is exactly one quarter of the ellipse 600. In the embodiment illustrated in FIG. 3, the cross-section of the first inner surface 222 corresponds at least a portion of the ellipse 600; more specifically, the curvature of the first inner surface 222 corresponds to the curvature of a portion of the reference circumference 650. As FIG. 3 shows, when light A emitted from one lateral side of the light guide plate 300 makes contact with the first inner surface 222, the light A will be reflected by the first inner surface 222 to the reflector 410. A portion of the light A is reflected by the reflector 410 and travels toward the optical film set 400 while another portion of the light A is broken by the structure on bottom of the light guide plate 300 into light moving in different directions toward the optical film set 400. In other words, the light A emitted from the light guide plate 300 is converted into diffused light by the first inner surface 222. In this way, the backlight module 100 of the present invention recycles the light A through reflection and improves the overall illumination and energy efficiency of the backlight module 100.

Furthermore, in the embodiment illustrated in FIG. 3 and FIG. 4, the height H of the recessed space 500 is substantially equal to one half of the length of the first axis 610 and the width W of the recessed space 500 is equal to one half of the length of the second axis 620, but are not limited thereto. In different embodiments, the height H and width W of the recessed space 500 can be different from one half of the length of the first axis 610 and one half of the length of the second axis 620. Furthermore, as FIG. 3 shows, the first inner surface 222 includes a top point 224 and an inner end 225 corresponding to a first reference point 631 and a second reference point 632 on the reference circumference 630. In other words, a segment between the first reference point 631 and the second reference point 632 is used as a reference to form the first inner surface 222 of the side wall 220.

In the present embodiment, the first reference point 631 and the second reference point 632 are respectively defined on two ends of the reference circumference 630. In other words, the cross-section of the first inner surface 222 corresponds to exactly one quarter of the ellipse 600, but is not limited thereto. In different embodiments, the first reference point 631 and the second reference point 632 can be selectively defined as any two points on the reference circumference 630. In this way, the first reference point 631 and the second reference point 632 can be used to take a portion of the reference circumference 630 as a reference for forming the first inner surface 222. Furthermore, as FIG. 4 shows, an eccentricity distance D is kept between the second reference point 632 and the second axis 620. In the present embodiment, the eccentricity distance D is preferably greater than one eighth (0.125) of the height H illustrated in FIG. 3, but is not limited thereto.

Figure 5:
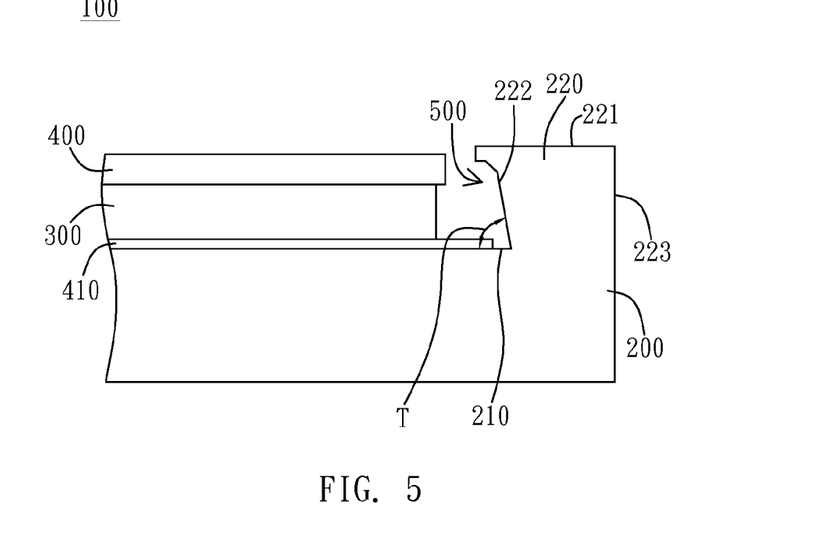
FIG. 5 is a schematic view illustrating the backlight module in another embodiment of the present invention, wherein the first inner surface is an inclined plane.

FIG. 5 illustrates another embodiment of the backlight module of the present invention. As FIG. 5 shows, a portion of the side wall 220 protrudes toward the light guide plate 300, wherein the first inner surface 222 extends from the above-mentioned protrusion toward the base plane 210. Furthermore, the first inner surface 222 includes a plurality of slant surfaces, wherein each slant surface has a different inclined angle. The first inner surface 222 sinks toward the outer surface 223 and forms a recessed space 500 while extending from top surface 221 toward the base plane 210. In other words, the distance between the first inner surface 222 and the outer surface 223 decreases as the first inner surface 222 extends toward the base plane 210.

Furthermore, an acute angle T (less than 90°) is included between the first inner surface 222 and the base plane 210. The first inner surface 222 inclines toward the reflector 410, and thus a portion of light emitted from the lateral side of the light guide plate 300 is reflected by the first inner surface 222 back to the reflector 410. The reflector 410 will reflect the emitted light back to the light guide plate 300 and the light will be optically processed and then emitted from the optical film set 400. In the present embodiment, the acute angle T is preferably 60°, but is not limited thereto; in different embodiment, the acute angle T can be adjusted according to the molding requirement of the frame 200, the slope or curvature of the first inner surface 222, the thickness of the light guide plate 300, the distance between the first inner surface 222 and the base plane 210, the dimension of the recessed space 500, or other factors.

Figure 6:
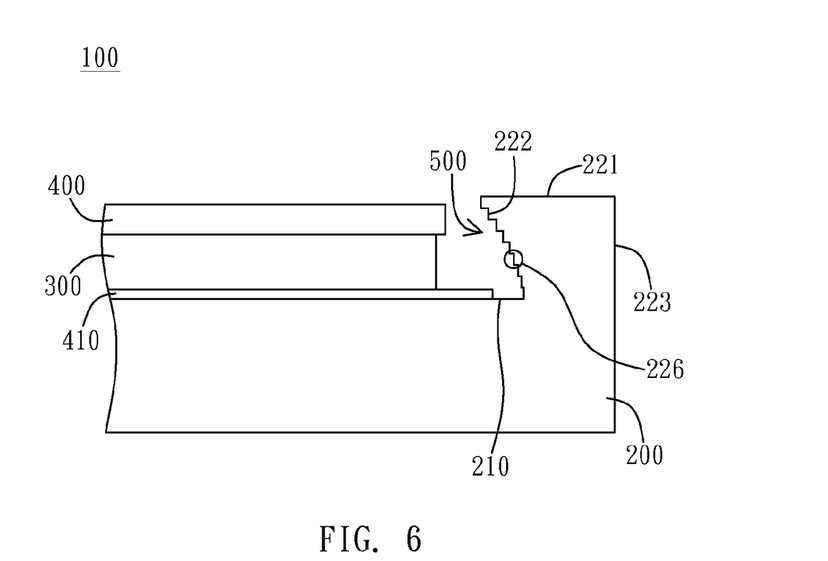
FIG. 6 is a schematic view illustrating the backlight module in yet another embodiment of the present invention, wherein the first inner surface is has a stepped shape.

FIG. 6 illustrates another embodiment of the backlight module 100 of the present invention. As FIG. 6 shows, the first inner surface 222 has a stepped shape and includes a plurality of step structures 226. In the present embodiments, the step structure 226 are disposed from the top surface 221 toward the base plane 210, wherein the direction of disposing the step structures 226 has a shape similar to the curve of an ellipse, but is not limited thereto; in different embodiments, the direction of disposing the step structures 226 can have other curvature or correspond to the curvature of other geometries (such as circles). The step structure 226 closer to the base plane 210 is also closer to the outer surface 223.

In the present embodiment, part of the light emitted from the light guide plate 300 will make contact with the step structure 226 and is then reflected by the step structure 226 toward the reflector 410. The light is reflected to the light guide plate 300 to be optically processed and then emitted out of optical film set 400. Furthermore, the step structures 226 have the same width and height, but are not limited thereto; in different embodiments, the number of step structures 226 and their individual width and height can be adjusted based on the slope of the first inner surface 222 required, the molding requirement of the frame 200, or other factors.

In the present embodiment, the step structure 226 can be considered as a protrusion extending outward from the first inner surface 222. In addition, the closer the step structure 226 is to the base plane 210, the shorter the length of the step structure 226 extends from the first inner surface 222, but are not limited thereto; in different embodiments, the length of the step structures 226 extending from the first inner surface 222 is the same. Furthermore, the step structures 226 have the same width, but are not limited thereto; in different embodiments, the widths of individual step structures 226 can be adjusted to be different from each other. For instance, the width of the step structure 226 can be gradually increased or decreased from the top surface 221 to the base plane 210.

Figure 7:
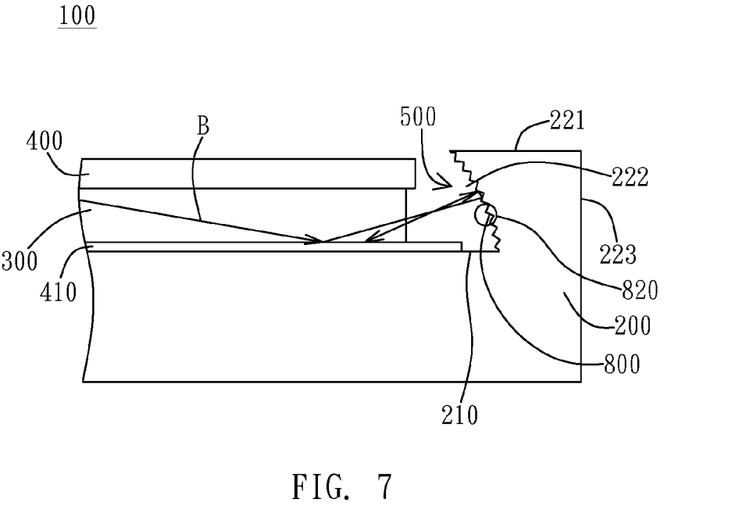
FIG. 7 is a schematic view illustrating the backlight module in yet another embodiment of the present invention, wherein the first inner surface has a Fresnel sawtooth surface structure.

FIG. 7 is a schematic view illustrating the backlight module in yet another embodiment of the present invention, wherein the first inner surface 222 has a Fresnel structure. As FIG. 7 shows, a plurality of sawteeth 820 are disposed on the first inner surface 222 and the sawteeth 820 substantially have the same size, but are not limited thereto; in different embodiments, the sawteeth 820 can have different sizes. Furthermore, in the present embodiment, the sawteeth 820 are disposed along a curve from the top surface 221 toward the base plane 210, wherein the curvation of the curve corresponds to the curvature of a portion of an ellipse, but is not limited thereto; in different embodiments, the sawteeths 820 can be disposed in different directions.

In the embodiment illustrated in FIG. 7, the sawtooth 820 has an inclined plane 800 substantially facing the base plane 210, wherein part of the light B exiting from the light guide plate 300 contacts the inclined plane 800 and is then reflected back to the light guide plate 300 and the reflector 410. The light B is then transformed into dispersed light which then travels toward the optical film set 400. Furthermore, please refer to both FIG. 6 and FIG. 7, wherein the step structure 226 has a right-angled cross-section. The sawtooth 820 illustrated in FIG. 7 has an acute-angled cross-section, wherein the cross-section of the sawtooth 820 has an included angle of 60°, but is not limited thereto; in different embodiments, the cross-section of the sawtooth 820 can have an included angle smaller than or greater than 90°.

Figure 8:
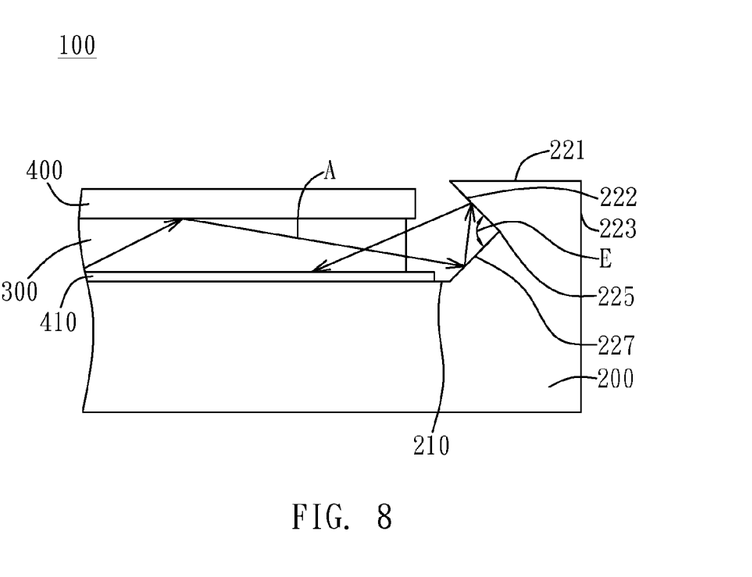
FIG. 8 and FIG. 9 are schematic views illustrating the backlight module in different embodiments of the present invention.

FIG. 8 is a schematic view illustrating the backlight module 100 of another embodiment of the present invention. In the present embodiment, the side wall 220 includes a first inner surface 222 and a second inner surface 227, wherein the first inner surface 222 extends from the top surface 221 toward the base plane 210 and stops at the inner end 225. The second inner surface 227 extends from the inner end 225 toward the base plane 210. In other words, the first inner surface 222 and the second inner surface 227 are connected at the inner end 225. Furthermore, the first inner surface 222 and the second inner surface 227 both are planar surfaces and an angle E is formed by the surfaces 222, 227. The angle E of the present embodiment is 30°, but is not limited thereto.

Figure 9:
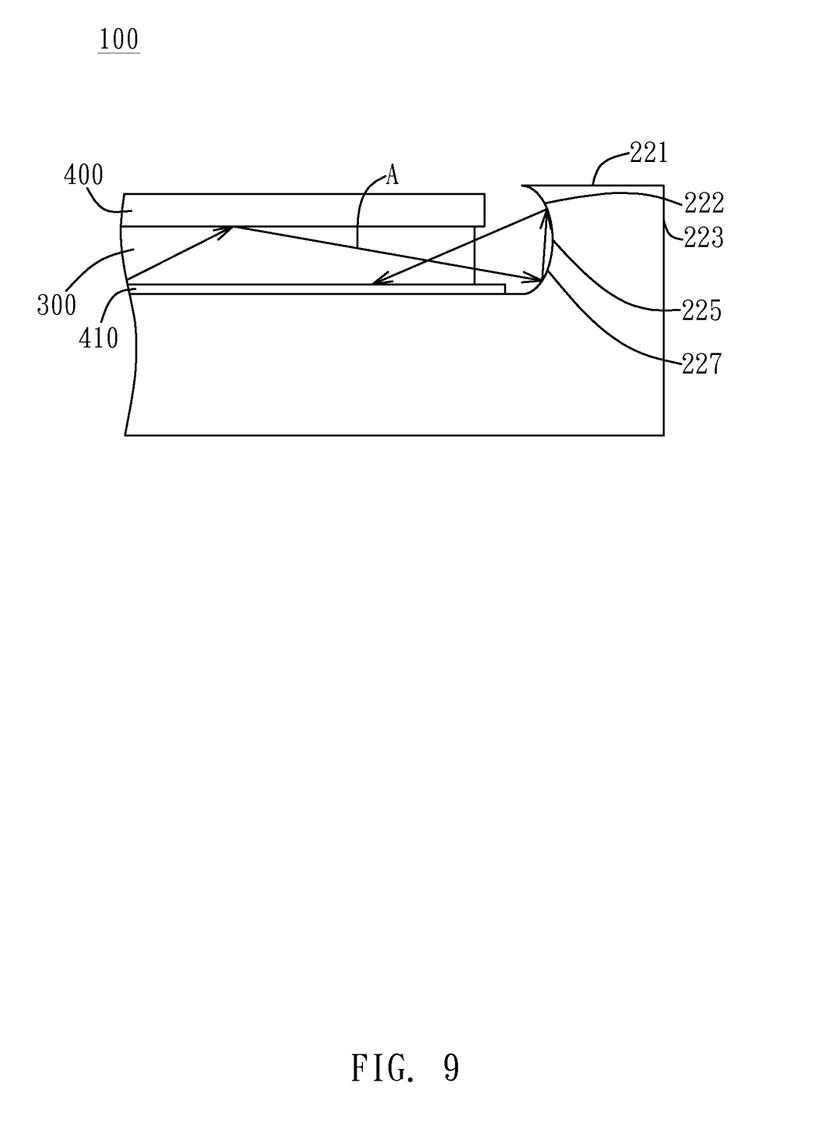

FIG. 9 is a schematic view illustrating a variation of the backlight module 100 illustrated in FIG. 8. In the present embodiment, the first inner surface 222 and the second inner surface 227 are both curved surfaces and sink toward the outer surface 223, wherein the first inner surface 222 and the second inner surface 227 are connected at the inner end 225. In this way, the first inner surface 222 and the second inner surface 227 substantially form an oval surface sinking toward the outer surface 223.

In the embodiments illustrated in FIG. 8 and FIG. 9, the light A exits from the lateral side of the light guide plate 300 and contacts the first inner surface 222, the light A will be reflected to the second inner surface 227 and then reflected again by the second inner surface 227 back to the light guide plate 300. The light A is then dispersed by the reflector 410 and travels toward the optical film set 400. In other words, the backlight modules illustrated in FIG. 8 and FIG. 9 use the first inner surface 222 and the second inner surface 227 to recycle the light A exiting from the light guide plate 300 to increase the overall brightness and improve the energy efficiency of the backlight module 100.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A backlight module, comprising:
a frame including a base plane and a side wall enclosing a disposition space, the side wall including a first inner surface substantially facing the disposition space and an outer surface corresponding to the first inner surface, wherein the first inner surface extends from a top end of the side wall toward an inner end of the side wall located on the base plane, a distance between the first inner surface and the outer surface is decreased as the first inner surface comes closer to the base plane; the first inner surface is a curved surface and a cross-section of the first inner surface corresponds to at least a portion of a reference circumference of an ellipse, the ellipse includes a first axis and a second axis and the reference circumference is obtained from a portion of the ellipse intersected by the first axis and the second axis; the first inner surface includes the top point and the inner end corresponding to a first reference point and a second reference point on the reference circumference; a first distance exists between the second reference point and the second axis, wherein the first distance is substantially smaller than or equal to one eighth (0.125) of the height of the recessed space; and
a light guide plate disposed in the disposition space, wherein the first inner surface sinks toward the outer surface, a recessed space is formed between the first inner surface and one side of the light guide plate.

2. The backlight module of claim 1, wherein the first inner surface has a stepped shape.

3. The backlight module of claim 1, wherein the first inner surface has a Fresnel surface.

4. The backlight module of claim 1, wherein the first inner surface has a plurality of sawteeth each having an oblique surface, the closer the oblique surface is to the base plane, the smaller the distance between the oblique surface and the outer surface.

5. The backlight module of claim 4, wherein the first inner surface and the second inner surface both are planar surfaces and an angle is formed by the first inner surface and the second inner surface.

6. The backlight module of claim 4, wherein the first inner surface and the second inner surface both are curved surfaces and sink toward the outer surface.

7. The backlight module of claim 1, wherein the side wall further includes a second inner surface extending from the inner end toward a bottom end of the side wall, the first inner surface and the second inner surface are connected at the inner end.

8. A backlight module, comprising:
a frame including a base plane and a side wall enclosing a disposition space, the side wall including a first inner surface substantially facing the disposition space and an outer surface corresponding to the first inner surface, wherein the first inner surface extends from a top end of the side wall toward an inner end of the side wall located on the base plane, a distance between the first inner surface and the outer surface is decreased as the first inner surface comes closer to the base plane; and
a light guide plate disposed in the disposition space, wherein the first inner surface sinks toward the outer surface, a recessed space is formed between the first inner surface and one side of the light guide plate, wherein a ratio of a width to a height of the recessed space is substantially between 0.1 and 0.3.

9. The backlight module of claim 8, the first inner surface has a stepped shape.

10. The backlight module of claim 8, wherein the first inner surface has a Fresnel surface.

11. The backlight module of claim 8, wherein the first inner surface has a plurality of sawteeth each having an oblique surface, the closer the oblique surface is to the base plane, the smaller the distance between the oblique surface and the outer surface.

12. A backlight module, comprising:
a frame including a base plane and a side wall enclosing a disposition space, the side wall including a first inner surface substantially facing the disposition space and an outer surface corresponding to the first inner surface, wherein the first inner surface extends from a top end of the side wall toward an inner end of the side wall located on the base plane, a distance between the first inner surface and the outer surface is decreased as the first inner surface comes closer to the base plane; and
a light guide plate disposed in the disposition space, wherein the first inner surface sinks toward the outer surface, a recessed space is formed between the first inner surface and one side of the light guide plate, wherein a ratio of a height of the recessed space to a thickness of the light guide plate is substantially between 1 and 2.

13. The backlight module of claim 12, the first inner surface has a stepped shape.

14. The backlight module of claim 12, wherein the first inner surface has a Fresnel surface.

15. The backlight module of claim 12, wherein the first inner surface has a plurality of sawteeth each having an oblique surface, the closer the oblique surface is to the base plane, the smaller the distance between the oblique surface and the outer surface.

16. The backlight module of claim 12, wherein the side wall further includes a second inner surface extending from the inner end toward a bottom end of the side wall, the first inner surface and the second inner surface are connected at the inner end.

17. The backlight module of claim 16, wherein the first inner surface and the second inner surface both are planar surfaces and an angle is formed by the first inner surface and the second inner surface.

18. The backlight module of claim 16, wherein the first inner surface and the second inner surface both are curved surfaces and sink toward the outer surface.

19. A backlight module, comprising:
a frame including a base plane and a side wall enclosing a disposition space, the side wall including a first inner surface substantially facing the disposition space and an outer surface corresponding to the first inner surface, wherein the first inner surface extends from a top end of the side wall toward an inner end of the side wall located on the base plane, a distance between the first inner surface and the outer surface is monotonically decreased as the first inner surface comes closer to the base plane;
a light guide plate disposed in the disposition space, wherein the first inner surface sinks toward the outer surface, a recessed space is formed between the first inner surface and one side of the light guide plate; and
a plurality of protrusions disposed on the first inner surface, wherein the closer the protrusion is to the base plane, the smaller an extending length of the protrusion toward the light guide plate is.

20. The backlight module of claim 19, wherein the first inner surface has a Fresnel surface.

* * * * *